United States Patent [19]

Smith

[11] Patent Number: 5,619,983
[45] Date of Patent: Apr. 15, 1997

[54] COMBINATION CONVECTION STEAMER OVEN

[75] Inventor: Mark J. Smith, Fuquay-Varina, N.C.

[73] Assignee: Middleby Marshall, Inc., Elgin, Ill.

[21] Appl. No.: 435,303

[22] Filed: May 5, 1995

[51] Int. Cl.$^6$ ..................................................... F24H 1/18
[52] U.S. Cl. ........................... 126/348; 126/369; 126/20; 126/21 A; 99/331; 99/441
[58] Field of Search ..................................... 126/348, 369, 126/20, 20.2, 21 A; 99/331, 332, 446, 468, 472, 330; 219/401, 492

[56] References Cited

U.S. PATENT DOCUMENTS

| | | | |
|---|---|---|---|
| 4,281,636 | 8/1981 | Vegh et al. | 126/348 X |
| 5,158,064 | 10/1992 | Willis et al. | 126/20 |
| 5,235,903 | 8/1993 | Tippmann | 126/369 X |
| 5,368,008 | 11/1994 | Oslin | 126/348 X |
| 5,515,773 | 5/1996 | Bullard | 126/20 X |

*Primary Examiner*—Larry Jones
*Attorney, Agent, or Firm*—Rhodes, Coats & Bennett, L.L.P.

[57] ABSTRACT

An improved combination convection/steamer oven is provided that is capable of maintaining an optimum steam saturation level without quenching by equipping the steam generating system of the oven with an adjustable water supply source. When the oven is initially being brought up to the preselected cooking temperature, a microprocessor controller uses a stored water flow rate profile to calculate the water flow rate required to prevent quenching yet enable a desirable rate of temperature increase. Once the oven has reached operating temperature, the microprocessor controller analyzes temperatures in a drain channel and the cooking cavity and, based on these parameters, calculates the water flow rate into the steam generating system required to optimize steam saturation in the cooking cavity. The steam generating system also has an improved atomizer including a rotating paddle wheel that is fed water from within by a sprayer fan.

20 Claims, 9 Drawing Sheets

COMBINATION CONVECTION STEAMER OVEN

FIELD OF THE INVENTION

The present invention generally relates to an oven that can operate as a convection oven, a steamer, or a combination of both, and particularly relates to a combination convection/steamer oven that maintains an optimal steam saturation level by automatically adjusting the water flow rate in the oven.

BACKGROUND OF THE INVENTION

Combination convection/steamer ovens, which are hybrids of conventional convection ovens and steamers, have been favorably received in the food service and cooking industries because of the shortened cooking times required with such ovens and the quality of food produced. Combination ovens cook some food at speeds rivaling those of microwave ovens yet without the quality problems often associated with microwaved food. Due to the ability of combination ovens to retain moisture in food much better than conventional ovens or microwaves, overcooking and the associated drying and shrinkage of food is much easier to avoid. In addition, by better retaining moisture in food, combination ovens produce healthier food that has not been cooked free of vitamins and other nutrients that are often lost during conventional cooking.

A typical combination convection/steamer oven includes a cooking cavity and a convection air heat source similar to a conventional oven. However, a combination oven also includes a steam generating system, which may include an auxiliary heating element to generate steam or may use the convection air heat source to generate steam. One key requirement for effective steam cooking is maximum steam saturation in the cooking cavity of the combination oven. Steam is a much better conductor of heat than is hot, dry convection air, thereby giving rise to the aforementioned fast cooking times. One pound of steam has an energy content of approximately 970 B.T.U.'s. However, even a slight amount of air present in a steam-filled cooking cavity markedly reduces the cooking ability of the steam, because the air acts as a layer of insulation around the food, preventing efficient heat transfer from the steam to the food. In cooking with steam, it is therefore desirable to maintain the highest possible steam saturation for the fastest possible cooking of food.

Another consideration involved in steam cooking with a combination convection/steamer oven is quenching. Quenching can occur when too much water is introduced into the system or when large loads are put into the oven, thereby overloading and cooling the heating elements that create the steam. A fine line exists between introducing too little water to the system, thereby preventing steam saturation and causing the associated inefficient heat conduction to the food, and providing too much water to the system, thereby causing quenching and the resultant cooling associated therewith. Therefore, to maximize the performance of a combination convection/steamer oven, the amount of water introduced into the system should match the maximum steam generating capacity of the system.

A typical gas-fired combination convection/steamer oven is disclosed in U.S. Pat. No. 5,014,679 to Childs et al. (hereinafter Childs), which includes a heating chamber, gas burners, a burner-heat exchanger that isolates combustion gases from the heating chamber, a water supply, and an atomizer for producing an atomized water spray that circulates over the surface of the heat exchanger to generate steam for cooking food in the heating chamber. The Childs oven regulates the steam content and temperature in the heating chamber by measuring the temperature of steam exiting a drain channel below the heating chamber. When the temperature sensor detects a drop in the drain temperature caused by a diminishing steam content in the oven, the sensor signals a controller to generate additional steam by turning on the water supply. Thus, the Childs oven uses a thermostat-type of steam generating system that supplies water to the system when the drain temperature drops below the preset cooking temperature and cuts off the water supply when the drain temperature rises above the selected cooking temperature.

A major disadvantage of the Childs oven is that it does not adjust the rate of water flowing into the steam generating system at startup or after introducing a cooking load into the oven, but only turns the water on or off depending on the temperature in the drain. Therefore, the quantity of water in the Childs oven fluctuates, which alternately leads to a lack of steam saturation and quenching, both of which are undesirable. Another disadvantage of the Childs oven is that the controller of Childs compares the drain temperature to the preset cooking temperature when determining whether to turn the water on or off. This often leads to inaccuracies when the actual temperature of the heating chamber is different from the desired preset temperature due to aging of the heating elements, scale build-up on the heat exchanger, heat loss through the walls of the heating chamber, and other unavoidable factors that hinder accurate operation.

A similar combination convection/steamer oven design is shown in the patent to Miller, U.S. Pat. No. 4,700,685, which uses electric heating elements instead of gas burners. However, like Childs, the Miller oven does not adjust the flow rate of water into the system; in fact the Miller oven continuously supplies water to the steam generating system and does not turn the water off during operation. U.S. Pat. No. 5,368,008 to Oslin discloses a steamer apparatus that adjusts the rate of steam entering the cooking chamber by varying power to the steam generating system. The Oslin steamer cycles between a cooking mode using high power and a quiescent mode using lower power. The Oslin device does not vary the rate of water flow.

Accordingly, up until now, there has not been a combination convection/steamer oven that adjusts the water flow rate to maximize the performance of the oven by continuously maintaining optimum steam saturation levels regardless of inherent inaccuracies and variations present in the oven.

SUMMARY AND OBJECTS OF THE INVENTION

The present invention provides an improved combination convection/steamer oven that is capable of maintaining an optimum steam saturation level without quenching the steam generating system. The combination oven is typical in that it includes a structural housing that contains a cooking cavity with side walls, a ceiling, and a floor. A drain channel is disposed beneath the cooking cavity and communicates with a drain opening in the floor of the cooking cavity. The oven also includes a heating apparatus, which in the disclosed embodiment heats convection air in conventional fashion and also converts water into steam as part of a steam generating system. In the preferred embodiment, the heating apparatus includes two sets of upwardly firing gas burners disposed in a compartment below one side of the cooking cavity. Extending vertically from the gas burners up through the cooking cavity are two sets of flue tubes that act as heat exchangers in the steam generating system.

The steam generating system includes a water supply source that delivers water to an atomizer which sprays droplets of water onto the flue tubes where the water is converted into steam. The atomizer of the preferred embodiment includes a sprayer fan that is disposed within a blower wheel. The sprayer fan and the blower wheel are turned together by a motor. As in other combination ovens, the blower also functions as a blower fan to circulate cooking gases, which may be air and/or steam, throughout the cooking cavity.

The combination oven of the present invention includes a microprocessor controller connected to the steam generating system for adjusting the water flow rate so as to maintain an optimum steam saturation level inside the cooking cavity. The controller receives input from two temperature sensor probes, one disposed in the drain channel for sensing the temperature of the interior of the drain channel, and another disposed in the cooking cavity for sensing the temperature of the interior of the cooking cavity. Also connected to the controller is an operator control panel on the front of the oven for inputting parameters such as cooking time, cooking temperature, fan speed, etc.

To determine whether or not the steam generating system should be actuated during the course of a cooking cycle, the microprocessor controller compares the temperature in the drain channel with a drain temperature set point derived from the cooking cavity temperature. The drain temperature set point is used to determine whether or not the steam generating system should be activated. By comparing the drain temperature to a derivative of the actual measured cooking cavity temperature, the steam generating system can be more accurately controlled than in previously designed ovens, such as Childs, where the drain temperature is compared to a preset cooking temperature.

If, after comparing the drain temperature to the drain temperature set point, the microprocessor determines that the steam generating system should be actuated, the microprocessor then determines whether any adjustment in the water flow rate is required to maintain the maximum steam saturation level possible inside the cooking cavity without quenching the heating elements. In calculating the water flow rate, the microprocessor considers the cooking cavity temperature and whether the cooking cavity temperature is increasing or decreasing. The microprocessor compares the rate of change of the cavity temperature to a predetermined rate of change stored in the microprocessor's memory and adjusts the water flow rate from its current setting to maintain the predetermined rate of change.

In view of the above, it is an object of the present invention to provide an improved combination convection/steamer oven that is capable of operation at optimum steam saturation capacity without quenching the heating elements.

Another object of the present invention is to provide a combination convection/steamer oven having a steam generating system with an adjustable water flow rate so as to more precisely maintain optimum steam saturation.

Another object of the present invention is to provide a steam generating system for a combination convection/steamer oven having a microprocessor controller that, when the oven is initially being brought up to the selected steam cooking temperature at startup, calculates the water flow rate required to prevent quenching.

Another object of the present invention is to provide a steam generating system for a combination convection/steamer oven having a microprocessor controller that shuts off the steam generating system when an excess amount of steam is generated.

Another object of the present invention is to provide a combination convection/steamer oven wherein the steam generating system has an improved atomizer that creates a finer mist of water for more efficient conversion into steam than previously designed combination oven atomizers. Other objects and advantages of the present invention will become apparent and obvious from a study of the following description and the accompanying drawings, which are merely illustrative of such invention.

DETAILED DESCRIPTION OF THE INVENTION

Figure 1:
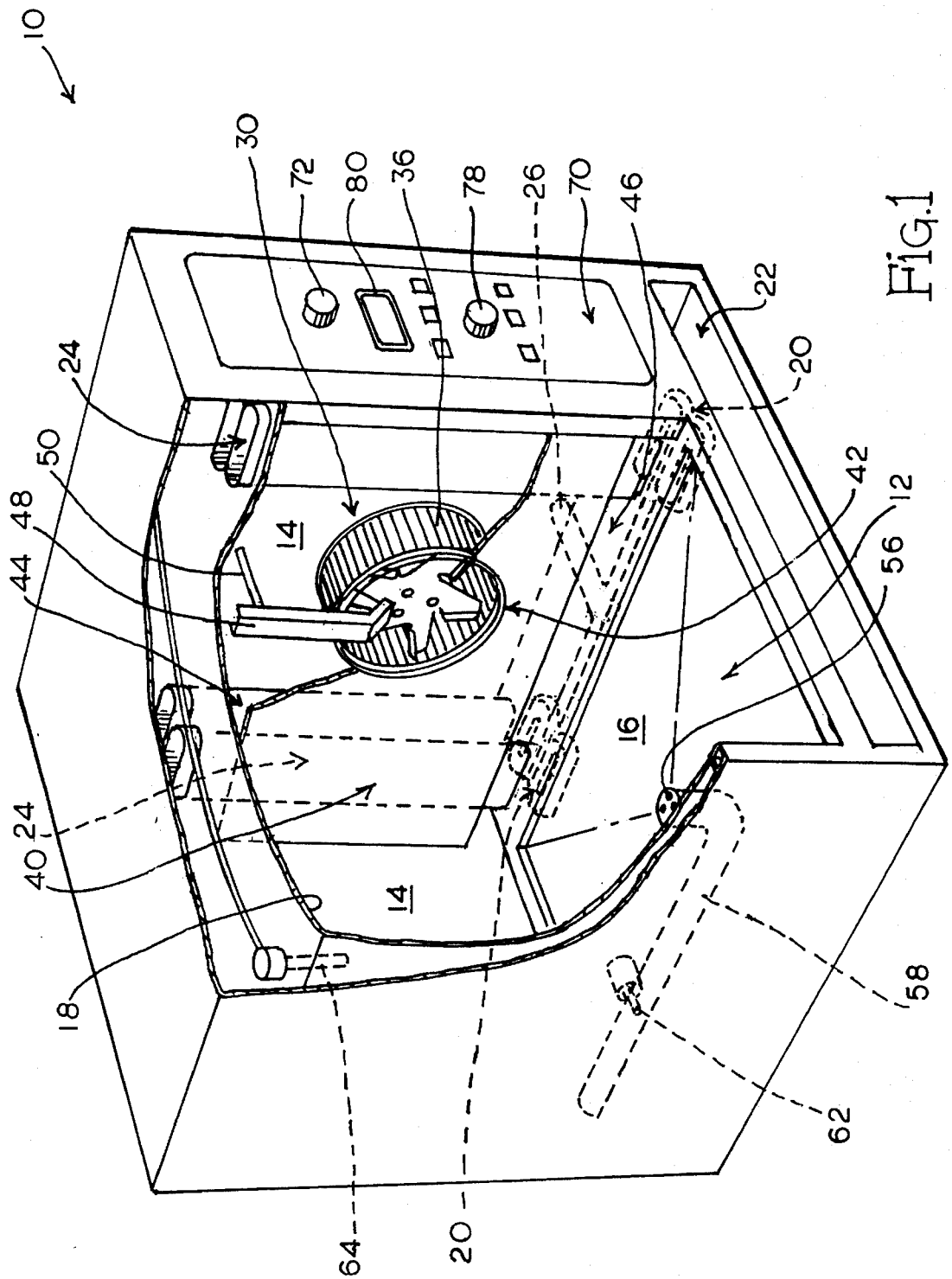
FIG. 1 is a perspective, partially cut-away view of the combination convection/steamer oven of the present invention.

With further reference to the drawings, FIG. 1 in particular, the combination convection/steamer oven of the invention is shown therein and generally indicated by the numeral 10. The combination oven 10 is typical in that it includes a cooking cavity 12 with side walls 14, a floor 16, and a ceiling 18. While not shown here, the oven of the invention 10 would of course include a door and may also include legs or other support members beneath the oven, or alternately may be stackable. Like all combination convection/steamer ovens, the oven 10 includes a heating system, a steam generating system, and a blower device for circulating cooking gases, which may be hot convection air and/or steam, inside the cooking cavity 12. The oven 10 also includes a drain opening 56 in the floor 16 of the cooking cavity 12, through which water, food juices, and excess steam are emptied out through a drain channel 58 disposed beneath the cooking cavity 12.

In the disclosed embodiment, the heating apparatus includes four gas burners, generally indicated by the numeral 20, which are arranged in two sets of two burners each in a burner compartment 22 beneath one side of the cooking cavity 12. The burners 20 fire upwardly into four corresponding flue tubes, generally indicated by the numeral 24, which extend vertically up through the cooking cavity 12. Like the burners 20, the flue tubes 24 are also arranged in two sets of two tubes each, one set near the front of the cooking cavity 12 and the other set near the back of the cooking cavity 12. The flue tubes 24 act both as chimneys to isolate combustion gases from the cooking cavity 12 by exhausting the combustion gases out the top of the oven 10 and as heat exchangers to heat convection air and/or to convert water into steam. As would be expected, a gas line 26 supplies the burners 20 with combustible fuel and includes both a main gas valve 28 and a pilot valve 29.

Figure 2:
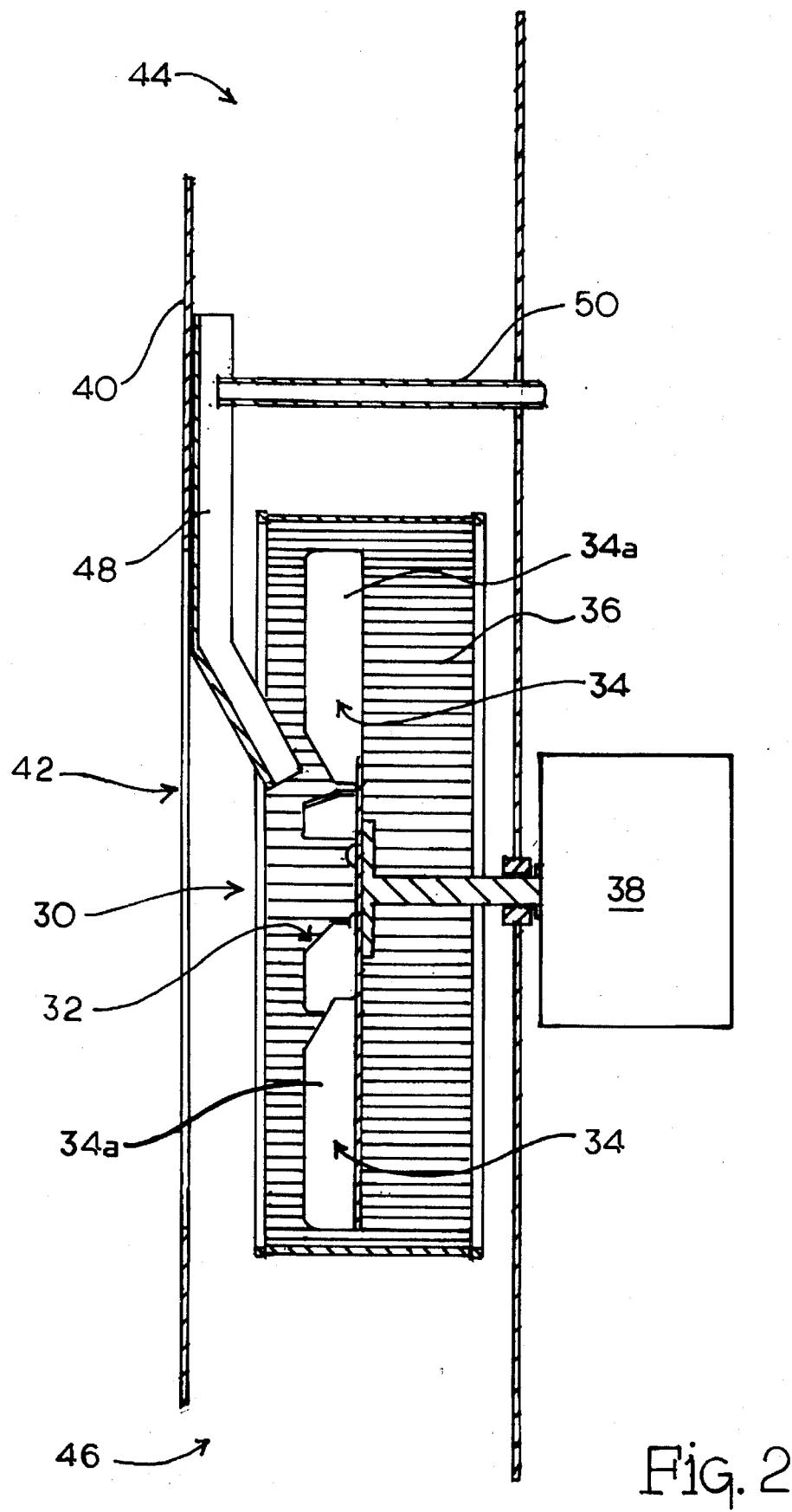
FIG. 2 is a cross-sectional view of a preferred embodiment of an atomizer in the oven.
Figure 2A:
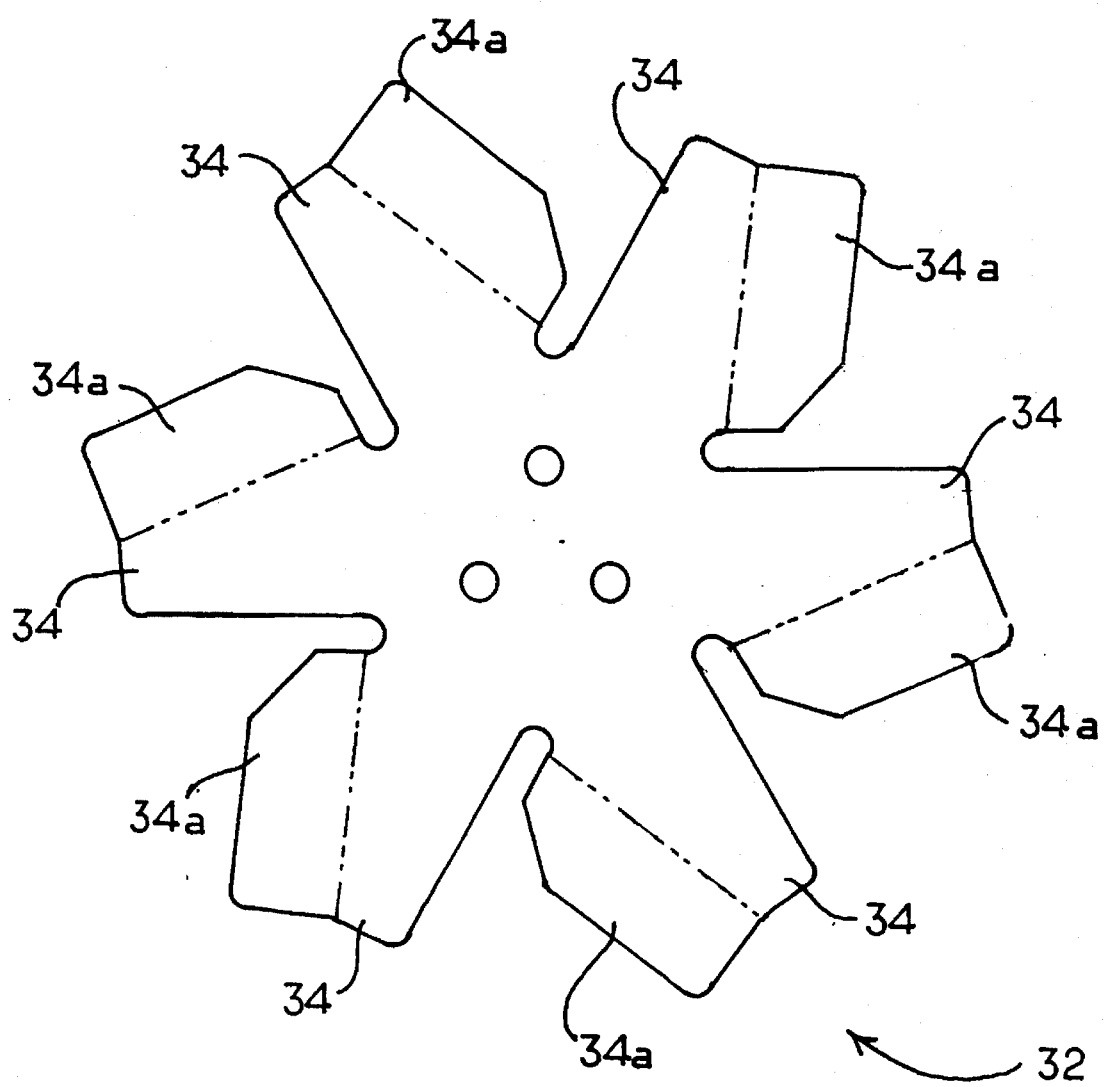
FIG. 2a is an elevational view of the central sprayer fan of the atomizer.

The steam generating system includes a water supply source that delivers water through a water line 50 having an adjustable water flow regulator valve 52. A water trough 48 is disposed beneath the water line outlet to deliver the water to an atomizer 30 disposed between the sets of flue tubes 24. The atomizer 30 sprays the water as a fine mist onto both sets of flue tubes 24 where the water is converted into steam. As shown best in FIGS. 2 and 2a, the atomizer 30 includes a rotating central sprayer fan 32 inside a blower wheel 36. The sprayer fan 32 is shown in FIG. 2a as having six fan blades 34, although any number of blades 34 could be used. Each blade 34 includes a flange 34a which is angled 90° C. degrees in the disclosed embodiment. Water is delivered to the center of the atomizer 30 where the sprayer fan 32 disperses the water as fine droplets. The blower wheel 36 forces the mist over the flue tubes. The two-stage atomizer creates a finer water mist than atomizers in previously designed combination ovens, thereby ultimately leading to more efficient steam generation.

As explained earlier, the blower wheel 36 also functions to circulate cooking gases, which may be hot convection air and/or steam, throughout the cooking cavity 12. The sprayer fan 32, blower wheel 36, and flue tubes 24 are separated from the remainder of the cooking cavity 12 by a baffle plate 40. The baffle plate 40 of the disclosed embodiment includes a center aperture 42 approximately 8 inches in diameter, a top aperture 44 between the baffle plate 40 and the ceiling 18 of the cooking cavity 12, and a bottom aperture 46 between the baffle plate 40 and the floor 16 of the cooking cavity 12. Cooking gases circulate from the cooking cavity 12 through the center aperture 42 into the blower wheel 36, which then forces the cooking gases outwardly over the flue tubes 24 where the cooking gases are heated. The heated cooking gases circulate back into the cooking cavity 12 through the top and bottom apertures 44, 46, respectively. The water trough 48 is mounted on one side of the baffle plate 40 and positioned so that the water trough 48 directs water flowing from the water inlet line 50 into the sprayer fan 32.

Figure 3:
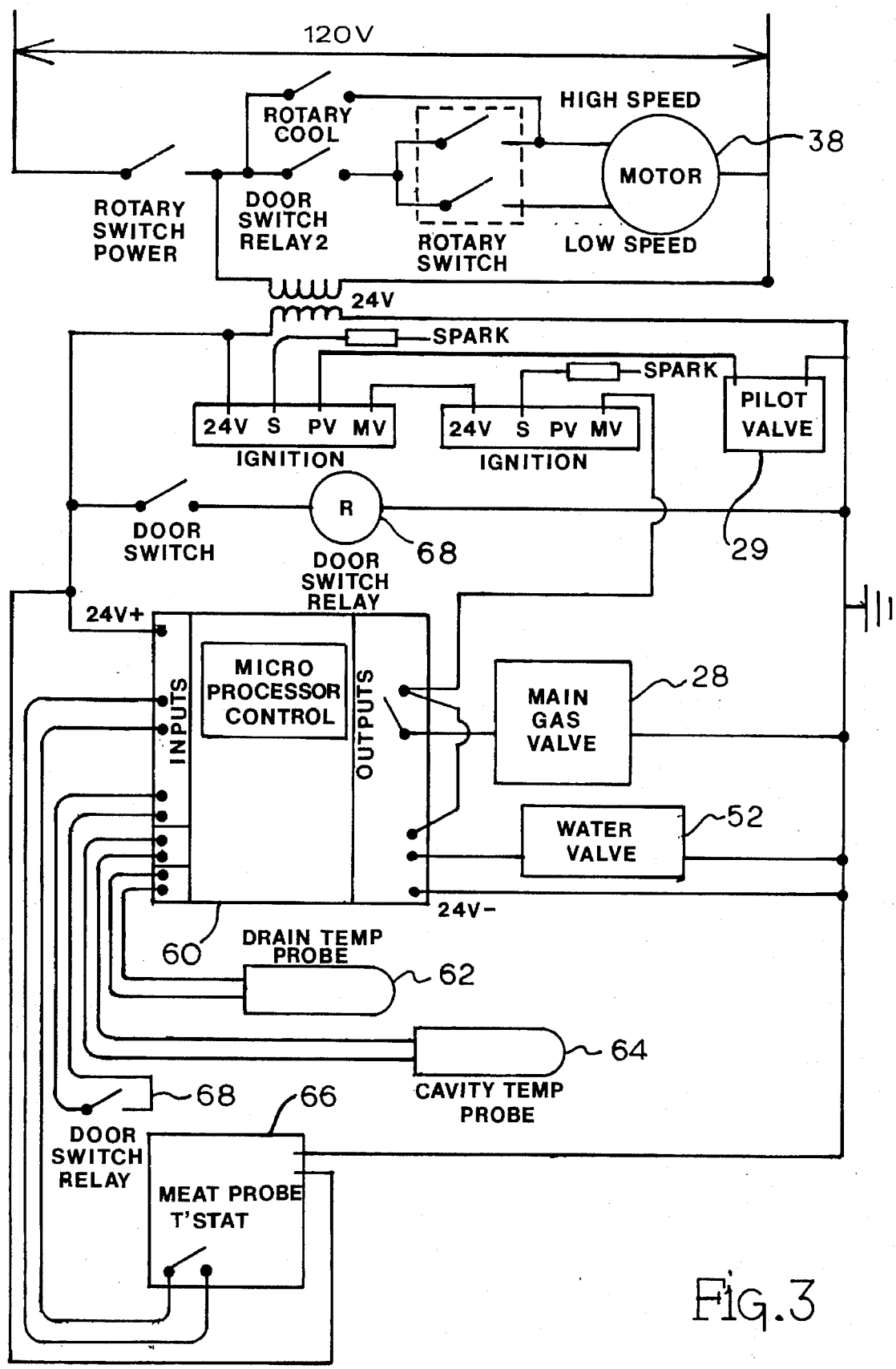
FIG. 3 is a schematic depiction of the components of the oven.

Now turning to the controls of the oven of the invention 10, best depicted in FIG. 3, a microprocessor controller 60 is provided for regulating both steam levels and cooking temperature. The microprocessor controller 60 includes two outputs, one output leading to the adjustable water valve 52 and a second output leading to the main gas valve 28. The microprocessor 60 regulates the steam levels from the steam generating system by adjusting the water flow rate into the system so as to maintain an optimum steam generation rate. When steam cooking, as explained above, the steam saturation level is optimized in the cooking cavity to provide the fastest cooking times possible without quenching the system, while preserving the moisture and nutrient content of food. The adjustable water valve 52 may be of several types, including a variable flow valve that adjusts the volume of water passing therethrough. In the embodiment, however, the water valve 52 is a solenoid type valve that cycles between open and closed positions at a frequency determined by the microprocessor 60 to obtain an average flow rate equal to the calculated flow rate. The preferred type of water valve 52 therefore achieves the same result as a variable flow valve, that is to allow adjustment of the water flow. With the second output, the microprocessor 60 regulates the temperature of the cooking cavity 12 by varying the gas flowing to the burners 20 through the main gas valve 28.

Two main temperature sensor probes are operably connected to inputs of the microprocessor 60, a drain temperature probe 62 and a cooking cavity temperature probe 64. The drain temperature probe 62 is disposed in the drain channel 58 for sensing the temperature of the interior of the drain channel 58, preferably at a specified distance from the cooking cavity 12. The cooking cavity temperature probe 64 is disposed in the cooking cavity 12 for sensing the temperature within the cooking cavity 12, preferably near the ceiling 18 of the cooking cavity 12. In the preferred embodiment of the oven 10, a meat probe thermostat 66 is connected to a third input of the microprocessor 60 for measuring the internal temperature of food, such as a roast, and for signaling the microprocessor 60 to shut off the oven 10 when the internal temperature of the food reaches a preselected temperature. A door switch relay 68 connected to a fourth input of the microprocessor 60 signals that the oven door is open, so that the microprocessor 60 can shut off the oven 10 to avoid scalding a user.

Figure 4:
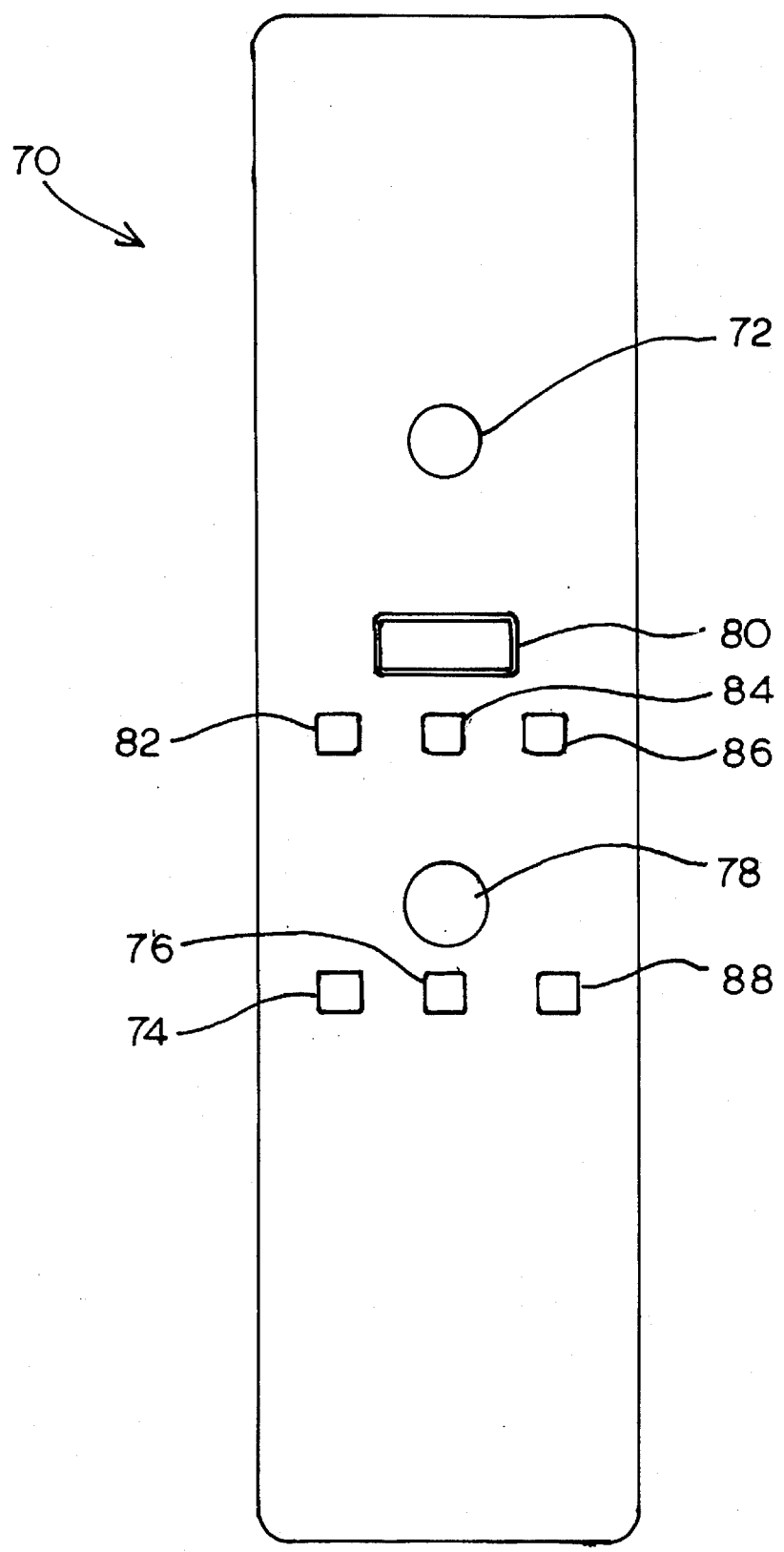
FIG. 4 is a depiction of a control panel on the front of the oven.

Also connected to the microprocessor 60 is a user control panel 70, the preferred embodiment of which is depicted in FIG. 4. As shown, the control panel 70 includes a blower speed control switch 72 for adjusting the speed of the atomizer/blower 30. A temperature set button 74 and a time set button 76 are used along with an increase/decrease control knob 78 and a digital display 80 when setting the temperature and time, respectively, of a cooking cycle. A hot air button 82 is activated when the oven 10 is operated in standard, convection oven mode, whereas a steam button 84 is activated when the oven 10 is operated as a steamer. Both buttons 82, 84 are activated when the oven 10 is operated as a combination convection/steamer oven. Impulse steam button 86 is activated to pulse the steam output from the steam generating system. A start/stop button 88 is activated to start the oven's cooking cycle after all parameters have been entered or to stop the oven's cooking cycle before the cycle is complete.

Figure 5A:
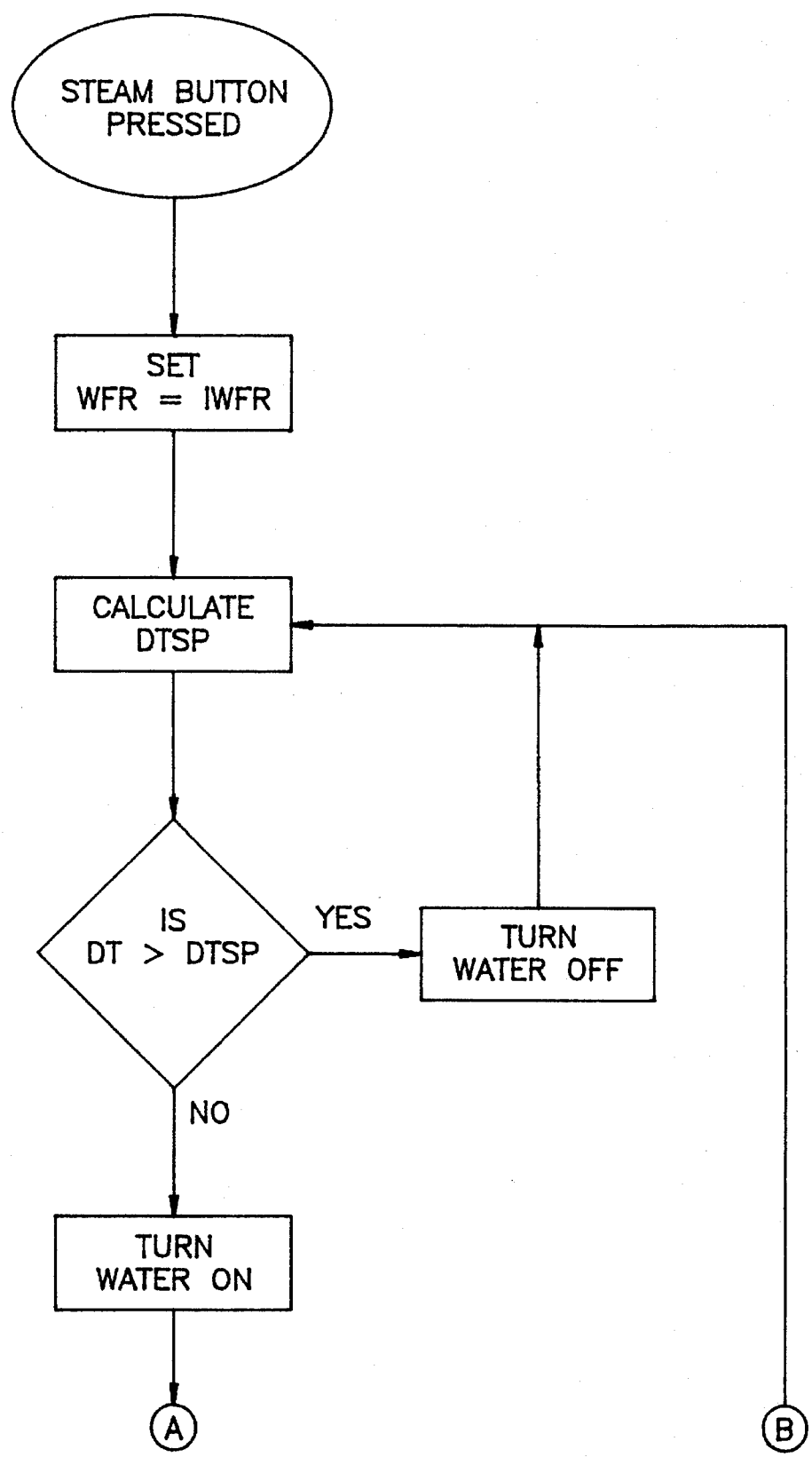
FIGS. 5A and 5B are a flow chart showing the operation of the steam generating system of the oven.
Figure 5B:
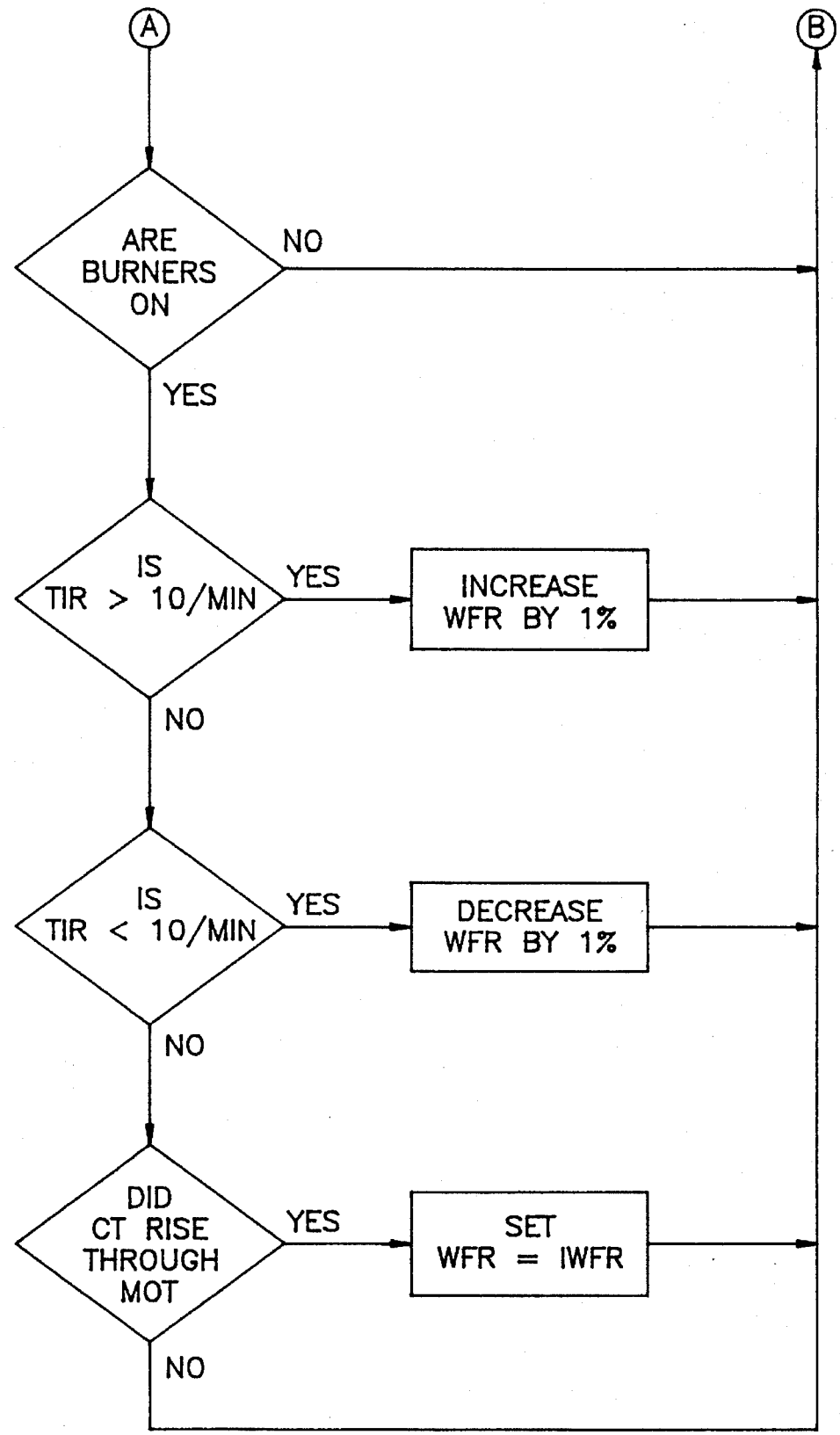
Figure 6:
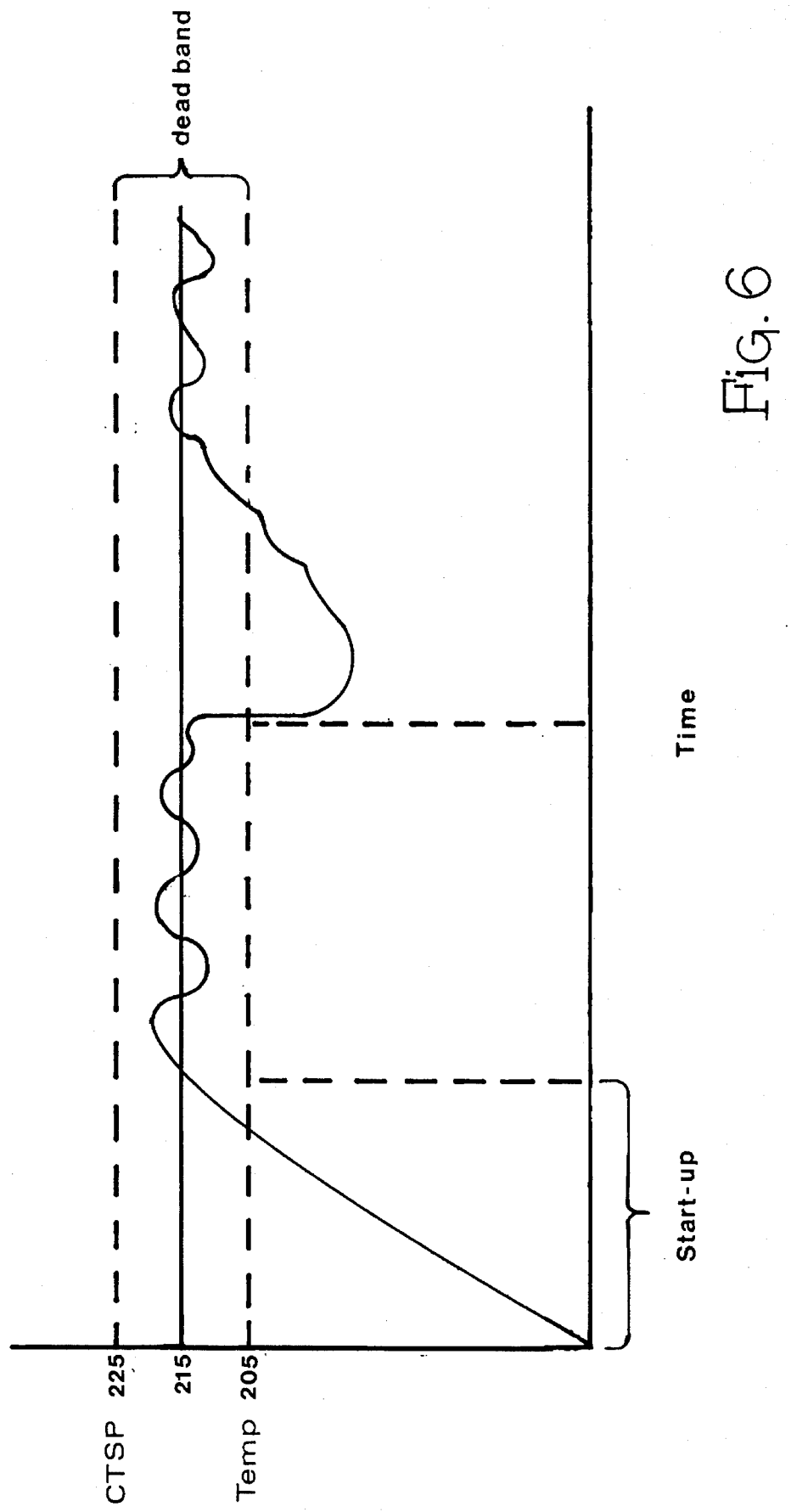
FIG. 6 is a graph showing a typical cooking cycle.

Referring now to FIGS. 5 and 6, the method of regulating the water flow rate in steam mode will be described. This method is also applicable to combination mode. In steam mode, the cavity temperature set point (CTSP) is set at a few degrees above the boiling point of water or approximately 215°. The oven is operated within a range or "deadband" of approximately 10° F. above and below the CTSP. Thus, the minimum operating temperature (MOT) would be approximately 205°. The maximum operating temperature in steam mode would be approximately 215°.

At the start of operation, the steam button 84 is pressed to activate the steam generation system. The microprocessor 60 determines the oven temperature when the steam button 84 is pressed. If the oven temperature is less than the minimum operating temperature (MOT), then the burners are activated to heat up the oven. To accelerate heating, the water could be turned off until the oven temperature reaches the minimum operating temperature (MOT). Once the temperature of the oven cavity reaches the minimum operating temperature (MOT), the water flow rate is set equal to a calculated initial water flow rate (IWFR). The initial water flow rate is a function of the oven cavity temperature. The formula for calculating the initial water flow rate is a fifth degree polynomial expression:

$$IWFR = a + b(ct) + c(ct)^2 + d(ct)^3 + e(ct)^4 + f(ct)^5,$$

where a, b, c, d, e and f are constants and CT is the cavity temperature.

Figure 7:
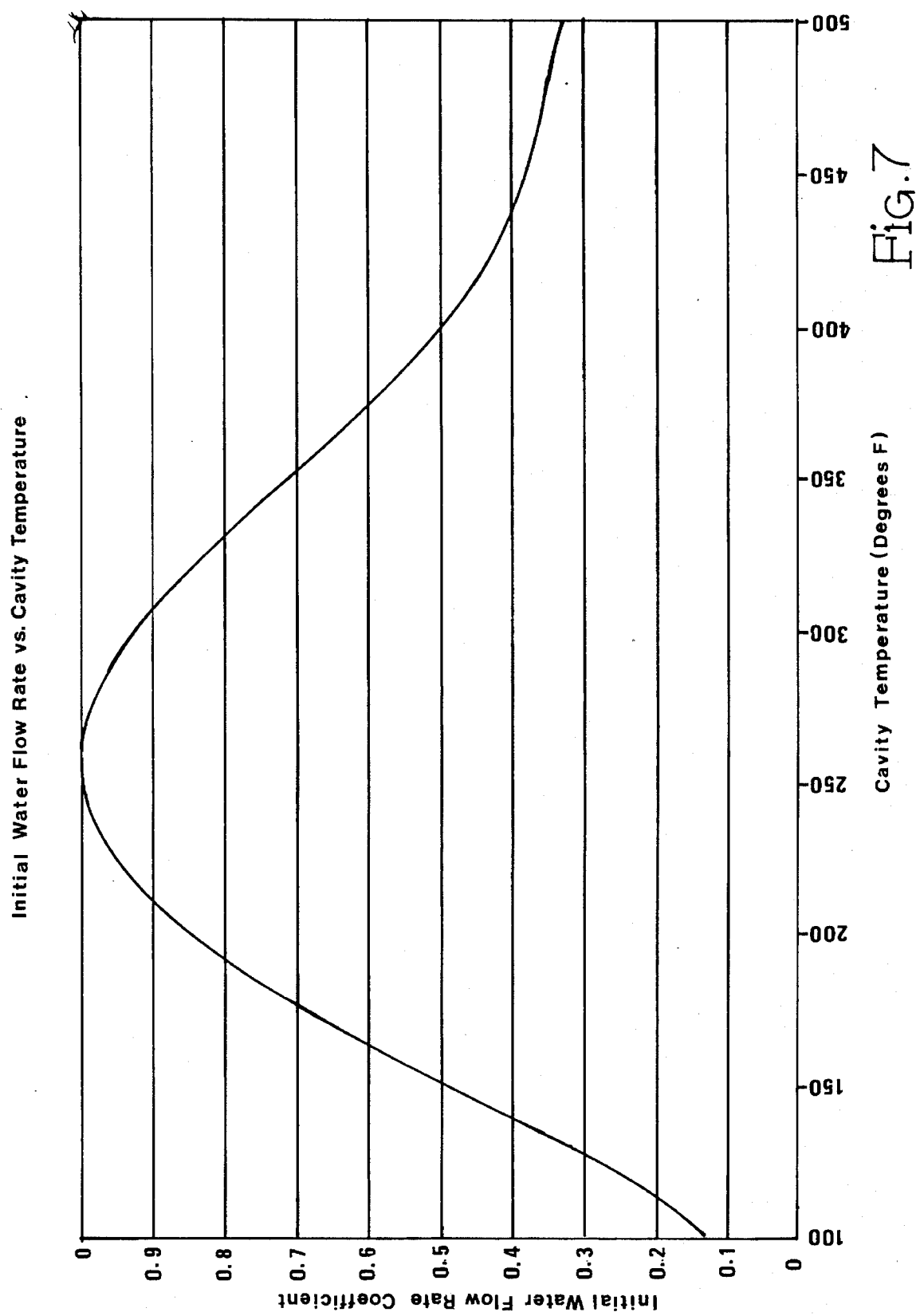
FIG. 7 is a graph showing an initial water flow rate profile.

A graph of the initial water flow rate (IWFR) versus cavity temperature (CT) is shown in FIG. 7. The value of the constants a, b, c, d, e and f will vary depending upon the size, configuration, and operating parameters of the oven. These values can be determined experimentally by operating the oven at a constant temperature and increasing the water flow rate until the temperature drops. The water flow rate at the point the temperature begins to drop is recorded and the process is repeated at predetermined temperature increments. The constants can then be selected to fit a curve to the empirically determined points which represent the maximum water flow rate which can be maintained without quenching the system.

As previously mentioned, the initial water flow rate (IWFR) is set based on the calculation described above. After setting the initial water flow rate (IWFR), the processor calculates the drain temperature set point (DTSP) which is used to determine whether or not the steam generating system should be actuated during a cooking cycle. The microprocessor 60 constantly compares the drain temperature (DT) input from the drain temperature probe 62 with the drain temperature set point (DTSP). The drain temperature set point (DTSP) is derived from the cavity temperature (CT) by using a formula that takes into account expected inherent heat losses between the cooking cavity 12 and the location in the drain channel 58 where the drain temperature probe 62 is located. An example of a linear formula for determining the drain temperature set point is: DTSP=(CT× 0.9)+5. This formula will vary depending on the particular configuration of the oven 10 and the placement of the drain temperature probe 62. By comparing the drain temperature to the actual measured cooking cavity temperature and taking into account inherent inefficiencies in insulation, heat transfer, etc., the steam generating system of the invention can be more accurately controlled than in previously designed ovens.

This drain temperature set point is constantly updated during the operation of the oven. Thus, the drain temperature set point will vary as the oven cavity temperature varies. After setting the DTSP, the microprocessor compares the actual drain temperature to the DTSP. If the drain temperature exceeds the DTSP, which indicates that excess steam is being produced, the water is turned off until the drain temperature drops below the DTSP. If the measured drain temperature is below the DTSP, which indicates that the desired degree of saturation is not being obtained, the water is turned on (or remains on). The value of the water flow rate (WFR) upon reactuation of the steam generating system is set to the same WFR as when the water was last turned off.

The principle behind this method of actuating and deactuating the steam generating system is that when steam is generated, air and/or steam is forced from the cooking cavity 12 out the drain channel 58. When water is converted into steam, the volume of the water increases on the order of 1500 times. When the cooking cavity 12 is saturated with steam, the temperature of the steam exiting the cooking cavity 12 through the drain channel 58 is very near the temperature inside the cooking cavity 12. The closer the cooking cavity is to its maximum level of steam saturation, the closer the drain temperature is to the cooking cavity temperature. Therefore, maximum steam saturation in the cooking cavity can be determined by comparing the drain temperature with the cooking cavity temperature.

If the drain temperature is below the DTSP, the processor then checks whether the burners are operating. If not, the processor leaves the water flow rate unchanged. If the burners are on, the processor determines whether an adjustment of the water flow rate is needed by determining the rate of temperature change in the cooking cavity of the oven. When the cavity temperature is rising at a rate (TIR) greater than a predetermined minimum temperature increase rate (TIR) assumed to be 10/min., then the water flow rate is increased by 1%. Similarly, if the cavity temperature is decreasing at a rate below the minimum temperature increase rate (TIR), the water flow rate is decreased. By maintaining the increase rate at a predetermined rate, the present invention minimizes the amount of fluctuation in the cavity temperature and prevents overshooting.

If the cavity temperature drops below the minimum operating temperature (MOT), the processor continues to adjust the water flow rate as previously described until the cavity temperature again reaches the minimum operating temperature (MOT). Once the cavity temperature reaches the minimum operating temperature (MOT), the water flow rate is reset to the initial water flow rate, as described above.

Based on the foregoing, it is apparent that the oven of the present invention regulates the steam levels in the cooking cavity by adjusting the water flow rate into the system so as to maintain an optimum steam generation rate. Thus, the present invention allows faster cooking of foods without quenching the heating elements. In the event that excess steam is produced, the steam generation system is shut off. Further, if the heating elements begin to cool while the burners are on (an indication of quenching), the system automatically decreases the water flow rate. The water flow rate is continuously adjusted as long as the burners remain on to maintain a predetermined rate of increase.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A combination convection/steamer oven, comprising:
  a) a cooking cavity having side walls, a ceiling, and a floor;
  b) a drain channel disposed beneath the cooking cavity and communicating with a drain opening in the cooking cavity;
  c) a heating apparatus for heating the cooking cavity;
  d) a steam generating system for supplying steam to the cooking cavity and including a water supply source having an adjustable water flow regulator;
  e) a blower for circulating cooking gases inside the cooking cavity; and
  f) a controller operably connected to the steam generating system for adjusting the rate of water flowing to the steam generating system so as to maintain a predetermined steam saturation level inside the cooking cavity, the controller including:
    i) a temperature sensor disposed in the cooking cavity for detecting the cooking cavity temperature and the rate of cooking cavity temperature change,
    ii) a processor connected to the temperature sensor for comparing the detected rate of cooking cavity temperature change to a predetermined cooking cavity temperature change rate and for calculating the water flow rate required to maintain the predetermined steam saturation level inside the cooking cavity, and
    iii) wherein the water flow regulator is responsive to a signal output from the processor setting the rate of water flowing to the steam generating system.

2. The combination convection/steamer oven of claim 1 wherein the processor includes a memory storage component for storing a water flow rate profile, and wherein the processor compares the detected cooking cavity temperature to the stored water flow rate profile for calculating an initial water flow rate upon startup of the oven.

3. The combination convection/steamer oven of claim 1 wherein the controller further comprises a temperature sensor disposed in the drain channel for detecting the drain temperature, and wherein the processor compares the detected drain temperature with a drain temperature set point derived from the detected cooking cavity temperature to determine whether to actuate the steam generating system.

4. The combination convection/steamer oven of claim 1 wherein the water flow rate is increased if the detected rate of cooking cavity temperature change is greater than the predetermined cooking cavity temperature change rate.

5. The combination convection/steamer oven of claim 1 wherein the water flow rate is decreased if the detected rate of cooking cavity temperature change is less than the predetermined cooking cavity temperature change rate.

6. The combination convection/steamer oven of claim 1 wherein the water flow rate is unchanged if the detected rate of cooking cavity temperature change is zero.

7. A combination convection/steamer oven, comprising:
   a) a cooking cavity having side walls, a ceiling, and a floor;
   b) a drain channel disposed beneath the cooking cavity and communicating with a drain opening in the cooking cavity;
   c) a heating apparatus for heating the cooking cavity;
   d) a steam generating system including a water supply source for supplying steam to the cooking cavity;
   e) a blower for circulating cooking gases inside the cooking cavity; and
   f) a controller operably connected to the steam generating system, the controller including:
      i) a temperature sensor disposed in the cooking cavity for detecting the cooking cavity temperature,
      ii) a temperature sensor disposed in the drain channel for detecting the drain temperature,
      iii) a processor connected to the temperature sensors for deriving a drain temperature set point from the detected cooking cavity temperature and for comparing the detected drain temperature to the derived drain temperature set point to determine whether or not to actuate the steam generating system.

8. The combination convection/steamer oven of claim 7, wherein:
   a) the temperature sensor in the cooking cavity detects the rate of cooking cavity temperature change;
   b) the processor includes a memory storage component for storing a predetermined cooking cavity temperature change rate;
   c) the processor compares the detected rate of cooking cavity temperature change to the predetermined cooking cavity temperature change rate and calculates the water flow rate required to maintain a predetermined steam saturation level inside the cooking cavity; and
   d) the water supply source includes an adjustable water flow rate regulator responsive to a signal output from the processor setting the rate of water flowing to the steam generating system.

9. A method for regulating water flow rate into of a steam cooking apparatus having a cooking cavity and a steam generating system, the steam generating system including an adjustable water supply source, a heating element, a heat exchanger, and a microprocessor controller, the method comprising the steps of:
   a) measuring the cooking cavity temperature;
   b) measuring the rate of cooking cavity temperature change;
   c) storing a predetermined cooking cavity change rate in a memory component of the microprocessor controller;
   d) comparing the measured rate of cooking cavity temperature change with the stored, predetermined cooking cavity temperature change rate;
   e) calculating the water flow rate required to achieve an optimum steam saturation level inside the cooking cavity; and
   f) adjusting the water flow rate into the steam generating system according to the calculated water flow rate.

10. The method of claim 9 further comprising the step of increasing the water flow rate if the measured rate of cooking cavity temperature change is greater than the predetermined cooking cavity temperature change rate.

11. The method of claim 9 further comprising the step of decreasing the water flow rate if the measured rate of cooking cavity temperature change is less than the predetermined cooking cavity temperature change rate.

12. The method of claim 9, wherein the cooking cavity is equipped with a drain, further comprising the steps of:
   a) deriving a drain temperature set point from the measured cooking cavity temperature;
   b) measuring the drain temperature;
   c) comparing the measured drain temperature to the drain temperature set point to determine whether or not to actuate the steam generating system.

13. The method of claim 12 further comprising the step of actuating the steam generating system if the drain temperature is less than the drain temperature set point.

14. The method of claim 12 further comprising the step of deactuating the steam generating system if the drain temperature is greater than the drain temperature set point.

15. The method of claim 9 further comprising the steps of:
   a) storing an initial water flow rate profile in the memory component of the microprocessor controller;
   b) comparing the measured cooking cavity temperature to the stored initial water flow rate profile to calculate an initial water flow rate; and
   c) setting the water flow rate upon startup of the oven according to the calculated initial water flow rate.

16. A method for setting a water flow rate in a steam cooking apparatus having a cooking cavity, a steam generating system including an adjustable water flow regulator, and a microprocessor controller for controlling the steam generating system, the method comprising the steps of:
   a) measuring the cooking cavity temperature;
   b) determining, as a function of the cooking cavity temperature, a water flow rate required to achieve an optimum steam saturation level in the cooking cavity without quenching the steam generating system apparatus during operation of the steam cooking apparatus; and
   c) controlling the adjustable water flow regulator with the microprocessor controller so as to deliver water to the steam generating system at the determined water flow rate.

17. The method of claim 16, further comprising the steps of:
a) storing water flow rate reference data in a memory component of the microprocessor controller; and
b) comparing the cooking cavity temperature with the water flow rate reference data to determine the water flow rate.

18. The method of claim 17 wherein the determination of the water flow rate takes place only during initial startup of the steam cooking apparatus.

19. A steam cooking apparatus, comprising:
a) a cooking cavity;
b) a cavity temperature sensor disposed in the cooking cavity for detecting the cooking cavity temperature;
c) a steam generating system for supplying steam to the cooking cavity and including an adjustable water flow regulator for delivering water at varying flow rates to the steam generating system; and
d) a microprocessor controller operably connected to the cavity temperature sensor and the water flow regulator for calculating, as a function of the detected cooking cavity temperature, a water flow rate required to achieve an optimum steam saturation level in the cooking cavity without quenching the steam generating system apparatus during operation of the steam cooking apparatus, and for adjusting the water flow regulator according to the calculated water flow rate.

20. The steam cooking apparatus of claim 19 wherein the microprocessor controller further includes a memory component for storing water flow rate reference data, and wherein the processor compares the detected cooking cavity temperature to said reference data to calculate the water flow rate.

* * * * *